United States Patent [19]

Rebstock et al.

[11] Patent Number: 5,525,362

[45] Date of Patent: Jun. 11, 1996

[54] FOOD PRODUCT COATED WITH AN EDIBLE ARTIFICIAL SKIN FORMING COMPOSITION

[75] Inventors: Donald A. Rebstock; Hamsa A. P. Thota, both of St. Simons Island, Ga.

[73] Assignee: Rich-SeaPak Corporation, St. Simons Island, Ga.

[21] Appl. No.: 466,153

[22] Filed: Jun. 6, 1995

Related U.S. Application Data

[62] Division of Ser. No. 328,944, Oct. 25, 1994, which is a continuation of Ser. No. 47,885, Apr. 14, 1993, abandoned, which is a continuation of Ser. No. 696,669, May 7, 1991, abandoned.

[51] Int. Cl.⁶ .................. A23L 1/0562; A23L 1/212; A23L 1/314; A23L 1/325
[52] U.S. Cl. .................. 426/92; 426/102; 426/574; 426/615; 426/641; 426/643; 426/657
[58] Field of Search .................. 426/92, 102, 615, 426/641, 652, 573, 643, 657, 574

[56] References Cited

U.S. PATENT DOCUMENTS

| | | | |
|---|---|---|---|
| 3,424,591 | 1/1989 | Gold | 426/102 |
| 3,425,848 | 2/1969 | Camirand et al. | 426/305 |
| 3,471,304 | 10/1969 | Hamdy et al. | |
| 3,472,662 | 10/1969 | Mason | 426/305 X |
| 3,527,646 | 9/1970 | Scheick et al. | |
| 3,754,931 | 8/1973 | Waitman et al. | 426/102 |
| 3,794,742 | 2/1974 | Harris et al. | 426/305 X |
| 4,199,603 | 4/1980 | Sortwell | 426/102 X |
| 4,324,807 | 4/1982 | Kim et al. | 426/574 X |
| 4,511,583 | 4/1985 | Olson et al. | 426/302 X |
| 4,513,019 | 4/1985 | Brancq. et al. | 426/302 |
| 4,576,646 | 3/1986 | Brancq. et al. | 426/302 |
| 4,661,359 | 4/1987 | Seaborne et al. | 426/89 |
| 4,778,684 | 10/1988 | DAmico et al. | 426/291 |
| 4,842,874 | 6/1989 | D'Amico et al. | 426/94 |
| 4,877,628 | 10/1989 | Stypula | 426/302 |
| 4,877,629 | 10/1989 | Stypula et al. | 426/302 |
| 4,900,573 | 2/1990 | Meyers et al. | 426/302 |
| 4,913,918 | 4/1990 | Stypula | 426/302 |
| 4,915,971 | 4/1990 | Fennema et al. | 426/302 X |
| 4,948,608 | 8/1990 | Stypula et al. | 426/302 |
| 5,019,403 | 5/1991 | Krochta | 426/305 X |
| 5,080,921 | 1/1992 | Reimer | 426/804 X |

OTHER PUBLICATIONS

Edible Films and Coatings: A Review, J. J. Kester, et al., Food Technology, Dec. 1966, pp. 47–59.

*Primary Examiner*—Arthur L. Corbin
*Attorney, Agent, or Firm*—Kenyon & Kenyon

[57] ABSTRACT

A grillable/broilable food product is disclosed. The product is based upon meat, fish or other seafood, poultry or vegetables, and is coated with an edible artificial skin forming composition which reduces sticking or charring of the food product to or on a hot surface.

The composition utilizes a blend of an alkyl cellulose ether and a protein, e.g. a plasma protein, and optionally a gum or browning agent, and a flavorant.

22 Claims, No Drawings

FOOD PRODUCT COATED WITH AN EDIBLE ARTIFICIAL SKIN FORMING COMPOSITION

This application is a Division of application Ser. No. 08/328,944, filed on Oct. 25, 1994, which is a Continuation of application Ser. No. 08/047,885, filed Apr. 14, 1993, now abandoned, which is a Continuation of application Ser. No. 07/696,669, filed May 7, 1991, now abandoned.

BACKGROUND OF THE INVENTION

Breaded or batter coated food products are widely popular in food service and retail sectors due to their convenience and taste appeal. Fish and other seafood, chicken, meat, and vegetable products are popular with consumers in breaded or batter coated forms.

Typically, the product is coated with a batter mixture of flour, starch and egg and then fried. Alternatively, before frying, the batter coated food product is coated with a breading such as corn meal, bread or cracker crumbs, and is then fried.

Breaded fish portions are manufactured by cutting portions of fish from frozen blocks followed by application of batter, breading if desired, and frying. Natural fish fillets are also offered for sale in batter coated and breaded forms. Food products coated in this manner absorb substantial amounts of oil affecting the taste, texture and nutritional value of the products. Unbreaded, batter free food products which are grillable or broilable are attractive to the health conscious consumer.

Certain batter free or unbreaded food products have been generally unsuitable for cooking on a grill or in a broiler, for example, unbreaded fish portions. When cooked on a grill or broiler which typically reaches temperatures of 500° to 700° F., the fish flesh chars, burns, and sticks to the heated surfaces. Additionally, the portions begin to separate into individual pieces of fillets. Glazes which are based on fats and gums do not perform adequately during grilling or broiling. The glazes tend to evaporate, burn off or otherwise detach from the food product exposing unprotected areas of the food product to high temperatures causing charring, adhesion to the hot cooking surface and break-up of the food product. Fish portions treated in this manner are susceptible to the same difficulties encountered with untreated portions; they adhere to heated surfaces, char, and break into pieces.

It is one objective of the present invention to provide a method of successfully cooking unbreaded or batter free food products including fish portions on a grill or broiler.

A further objective is to provide an edible artificial skin encased food product which resists sticking to a grill or broiler upon cooking.

Still another objective is to provide an edible, artificial skin-encased food product which retains more of its structural integrity upon grilling or broiling.

Another objective is to provide an edible artificial skin which need not be discernable upon eating, while substantially maintaining the texture, flavor and juiciness of the food product.

A further objective is to provide a composition which forms an edible artificial skin about a food product which can be grilled or broiled.

Still another objective is to provide methods of preparing such edible artificial skins.

It is also an objective of the invention to provide an artificial skin coated food product that can be microwaved, baked, or fried.

These and other objectives will be apparent to those skilled in the art from the teachings contained herein.

SUMMARY OF THE INVENTION

The invention described herein relates to a process of preparing a substantially batter free, unbreaded food portion, wherein an edible artificial skin-forming composition is applied to the food portion, the composition is hydrated with an aqueous medium, and the composition is heat set to form the edible, artificial skin.

DETAILED DESCRIPTION OF THE INVENTION

The present invention relates to compositions for forming an edible artificial skin about a food product and the process for encasing a food portion in an edible artificial skin.

As used herein, the term "food portion" refers to edible meat, fish, poultry or vegetables divided into quantities which are generally recognized as single servings, or fractions of single servings. For example, a food portion of fish can be a slice of fish or fish fillet having a weight ranging from about two ounces to as high as about twelve ounces. A poultry food portion could be generally equivalent to a chicken breast, about four to six ounces, or a smaller preformed piece of chicken or turkey about the size of an hors d'oeuvre, about one ounce.

The term "artificial skin" is used to refer to the set coating which is formed on or about the food portion, and which is generally effective for reducing the tendency to stick to grills, ovens, pans or other hot surfaces.

The term "gum" is used to refer to ingredients which are mucilagenous when in the hydrated form, and include those compositions recognized in the food industry as water soluble and insoluble gums, natural, synthetic and semi-synthetic gums, etc.

The term "alkyl cellulose ether" as used herein refers to those polysaccharides which are used in the food industry as emulsifiers, thickener builders, binding agents, film forming agents, etc. which are based upon cellulose and includes, for example, methylcellulose, ethylcellulose, hydroxy substituted alkyl cellulose ethers, such as hydroxypropylmethylcellulose, hydroxyethylcellulose and the like.

The terms "protein" and "proteinaceous" are used in the general sense to refer to polypeptide containing ingredients, which tend to denature or coagulate upon heating. Thus, these terms include blood plasma protein, egg protein albumin and other proteins.

The "oil" which can be used to heat set the skin-forming blend may be any edible oil, preferably derived from non-tropical vegetable sources to reduce or minimize any cholesterolizing or atherosclerotic effects and to maximize desirability of the coated food portions.

"Browning agents" refers to ingredients which carmelize or otherwise darken upon heating over a typical cooking time and at a conventional cooking temperature. With respect to grilling, broiling, etc., this time can be short, e.g., 30 seconds, or as long as e.g., 15 minutes, depending on the food which is cooked. With respect to microwavable foods, the times tend to be shorter, e.g., 30 seconds to several minutes. Components useful as browning agents include for example, monosaccharides, disaccharides, nonfat milk, whey and corn syrup solids.

The preferred edible artificial skin forming composition essentially comprises about 80 to 90% by weight alkyl cellulose ether and about 10 to 20% by weight of a protein.

The preferred alkyl cellulose ether is hydroxypropylmethylcellulose, such as METHOCEL-E4M-P (R), a product of The Dow Chemical Corporation.

The preferred protein is a blood plasma hydrolyzed meat protein such as AMP 600 (R), a product of American Meat Protein Corporation.

The preferred composition additionaly may contain about up to about 10% by weight of a gum, such as guar gum.

The artificial skin forming composition additionally may contain a browning agent, preferably a monosaccharide, and optionally a flavorant. Addition of browning agents to the artificial skin forming composition/blend enhances the appearance of the artificial skin, and makes the food product ideal for cooking in a microwave oven.

The preferred monosaccharide browning agent is dextrose, which may optionally comprise about 3 to 5% of the edible skin forming composition.

The flavorant may be used to alter the taste of the product, e.g., provide a smokey or buttery flavor, or to enhance the inherent natural flavor of the product. Examples of such flavorants include lemon butter, dill, garlic, cajun, lemon herb and barbecue, which are optionally present in about a 5 to 10% concentration based upon the weight of the blend.

The blend of artificial skin forming ingredients is combined geometrically typically in the dry state, to facilitate a thorough, even dispersion.

The artificial skin forming composition is applied to the food portion in an amount effective for forming the artificial skin, such as about 0.5 to 2% of the weight of the food portion, and preferably in an amount ranging from about 1.00 to about 1.5% weight percent. Practical weight determination methods utilize "pick-up" values which refer to the increases in weight on a percentage basis of the food portion as it is processed. Hence, when the skin forming composition has a pick up weight of 1.5 to 2%, this percentage is calculated based on the weight of the food portion prior to the addition of the skin-forming composition.

The food product can be raw, frozen, or pre-cooked prior to treatment. The food product can also be skinned prior to treatment.

To form the artificial skin, the surface of the food product may be kept at a suitable initial temperature for applying the composition, e.g., about 20° F. or higher. Hence, pre-warming of the surface of the food portion may be appropriate. It may also be appropriate to pre-moisten the food product with water if the food product is dry, to allow the artificial skin forming composition to adhere to the surface of the food product.

The artificial skin forming composition can be applied to the food product in any suitable fashion, such as mechanically or manually.

Application of the artificial skin forming composition is typically followed by hydration, such as by spraying or another type of application of an aqueous medium such as warm water. The artificial skin forming composition typically absorbs the aqueous medium in an amount ranging from about 5 to 8% (pick-up value) by weight relative to the weight of the food product.

The food product coated with the hydrated artificial skin composition may then be subjected to a suitable heat treatment to set the composition, thus forming the artificial skin. The heat treatment preferably involves passing the food product through a hot vegetable oil bath at a temperature less than about 400° F., preferably 365° to 375° F., for a time period sufficient to set the composition and form the artificial skin. Typically, heat setting is accomplished in about 20 to 30 seconds. The heat set artificial skin food portion absorbs little if any vegetable oil during the heat setting step, usually no more than about 2 to 5% by weight of the food product.

Alternatively, following the hydration step the food product can be sprayed with an oil and heat treated in a convection oven or by similar means at a temperature of about 400° F. to heat set the artificial skin.

Alternatively, the skin-forming composition may be set by means of hot water or steam, such as in a hot water bath or a steam cooking apparatus, such as a steam tunnel. The hot water bath temperature typically ranges from about 165° F. to about 175° F., and the steam typically ranges from about 200° F., to about 212° F. Set times using either of these aqueous heating systems ranges from about 1 to 3 minutes.

After heat setting the skin, the food product can be frozen, cooked for consumption, or pre-cooked and then frozen.

When the aqueous heat-setting system is used, the food portion with the artificial skin formed thereon can be coated with an oil or other suitable releasing agent to further cause the food portion to cook without substantially sticking to a hot surface.

The composition and process of the invention form a functional edible artificial skin which encases the food product and is effective for rendering the artificial skin encased food product substantially non-sticking to cooking surfaces, while providing structural support for the food. Hence, the food product does not fall apart readily, and retains its tender, juicy properties. The artificial skin encased food products are thus suitable for cooking on a grill or broiler substantially without the problems of sticking, charring or breaking up of the food product.

Further benefits of the invention include minimal pick up of oil by the artificial skin, retention of the pleasing texture, mouth feel, flavor and juiciness, and some protection against freezer burn during frozen storage.

The invention is further illustrated through the use of the following examples.

EXAMPLE I

Cod portions are cut from a frozen block maintained at a temperature of 0° to 10° F. to a dimension of 3⅓×3⅛×½ inches. The surface of each portion is warmed slightly to a temperature of about 20° to 28° F. by blowing hot air over the fish portion.

The artificial skin forming blend is formed by dry mixing Methocel-E4M-P (R) brand hydroxypropylmethylcellulose, AMP-600 (R) brand hydrolyzed bovine blood plasma protein, and guar gum as follows:

| | |
|---|---|
| Methocel-E4M-P | 85% |
| AMP-600 | 10% |
| Guar Gum | 5% |
| Total | 100% |

The artificial skin forming blend is applied to the fish portion by a typical flour dusting machine such that the amount of blend applied to the fish constitutes 1.00 to 1.5% by weight of the food portion. (the weight of the fish with the blend applied thereto is increased relative to the pre-application weight by 1.00–1.5%). The treated portions are then passed through water spray jets in an enclosed cabinet. The water temperature is 35°–50° F. The portions pick up 5 to 8% by weight water based upon the weight of the food portions prior to treatment with the spray jets.

The hydrated portions are passed through a vegetable oil bath at a temperature of 365° F. for 20 to 28 seconds to set the artificial skin. The portions pick up less than 2% by weight of the vegetable oil, based on the weight of the food portion with the hydrated skin-forming blend applied thereto. The artificial skin encased portions are then frozen and stored.

After thawing, the portions are grilled at a temperature of 500° to 700° F. The portions do not substantially stick to the grill, char, or break apart. The presence of the artificial skin is indiscernable by mouth feel.

EXAMPLE II

An artificial skin forming blend containing a browning agent is prepared in accordance with the following recipe:

| Methocel-E4M-P | 85% |
|---|---|
| AMP-600 | 10% |
| Dextrose | 5% |
| Total | 100% |

The artificial skin forming blend is applied to raw, skinned, whole pollock fillets at an amount equivalent to 1.5% by weight of the fillet. The treated fillets are then passed through water spray jets as described in Example I. The hydrated portions are passed through a vegetable oil bath at a temperature of 365° F. for 28 seconds to set the artificial skin. The fillets pick up less that 2% by weight vegetable oil. These percentages are calculated as described in Example I. The artificial skin coated fillets are then frozen and stored.

Alternatively, the fillets are thawed and cooked in a microwave oven producing a cooked fillet with a browned, broiled appearance. The artificial skin is indiscernable by mouth feel.

The fillets are thawed and flame broiled for about 3 to 5 minutes per side. Upon broiling the fillets do not stick to the heated surfaces or break apart.

EXAMPLE III

An artificial skin forming blend containing a browning agent is prepared in accordance with the following recipe:

| Methocel-E4M-P | 90% |
|---|---|
| AMP-600 | 7% |
| Dextrose | 3% |
| Total | 100% |

The artificial skin forming blend is applied to raw, onion slices (0.25 to 0.5 inch thickness), in an amount equivalent to about 1.5% by weight of the slice, calculated as in Example I. The treated slices are then passed through water spray jets and vegetable oil bath at a temperature of 365° F. for 28 seconds to set the artificial skin. The slices pick up less that 2% by weight vegetable oil. The artificial skin coated slices are then frozen and stored.

The coated slices are thawed and cooked in a microwave oven, producing a cooked onion product with a browned, broiled appearance. The artificial skin is indiscernable by mouth feel.

The slices are alternatively thawed and broiled for about 2 minutes per side. Upon broiling the slices do not stick to the heated surfaces or break apart.

EXAMPLE IV

The artificial skin forming blend described in Example III is applied to raw zuccinni slices (0.5 to 0.75 inch thickness), in an amount equivalent to about 1.5% by weight of the slice calculated as described in Example I. The treated slices are then passed through water spray jets and passed through a vegetable oil bath at a temperature of 365° F. for 28 seconds to set the artificial skin. The slices pick up less than 2% by weight vegetable oil. The artificial skin coated slices are then frozen and stored.

The slices are thawed and cooked in a microwave oven producing a cooked zuccinni product with a browned, broiled appearance. The artificial skin is indiscernable by mouth feel.

The slices are alternatively thawed and broiled for about 2 minutes per side. Upon broiling the slices do not stick to the heated surfaces or break apart.

EXAMPLE V

A four to eight ounce portion of beef is pounded to tenderize the product, and coated with the formulation described in Examples I or II.

The coated beef portion is hydrated and passed through an oil bath as described therein at a temperature of 365° F. for a period of 20 to 28 seconds. The coated beef portion picks up about 1.5–2.0% vegetable oil. The artificial skin encased beef product is then frozen and stored.

The coated product is removed from the freezer and cooked on a grill or in a pan to produce what is recognized as "chicken-fried steak". The chicken-fried steak does not substantially stick to the grill, and when fried, does not absorb any appreciable amount of frying oil or fat, thus having a lower fat content than conventionally prepared chicken-fried steak.

Alternatively, when the formulation with the browning agent is used, the food portion can be cooked with a microwave oven for several minutes to produce a microwave oven prepared chicken-fried steak.

While certain preferred embodiments have been described herein in detail, numerous alternative embodiments are contemplated as falling within the invention. Consequently, the scope of the claims is not to be limited to the examples contained herein.

What is claimed is:

1. A substantially batter free, unbreaded food product comprised of a food portion coated with a hydrated and heat set edible artificial skin forming composition comprised of:

80 to 90% of an alkyl cellulose ether; and 7 to 20% of a plasma protein;

said composition being 100% by weight; wherein said coated food portion is capable of being cooked on a hot surface without sticking, charring or losing its integrity.

2. The substantially batter free, unbreaded food product of claim 1 wherein said blend further comprises up to 10% of a gum.

3. The substantially batter free, unbreaded food product of claim 2 wherein said gum is guar gum.

4. The substantially batter free, unbreaded food product of claim 1 wherein said blend further comprises up to 10% of a browning agent.

5. The substantially batter free, unbreaded food product of claim 4 wherein said browning agent is selected from the group consisting of monosaccharides, disaccharides, nonfat milk, whey and corn syrup solids.

6. The substantially batter free, unbreaded food product of claim 4 wherein said browning agent is dextrose.

7. The substantially batter free, unbreaded food product of claim 6 wherein said dextrose comprises about 3 to 5% of said substantially batter free, unbreaded food product.

8. The substantially batter free, unbreaded food product of claim 1 wherein said blend further comprises a flavorant.

9. The substantially batter free, unbreaded food product of claim 8 wherein said flavorant is selected from the group consisting of lemon butter, dill, garlic, cajun, lemon herb and barbecue.

10. The substantially batter free, unbreaded food product of claim 8 wherein said flavorant provides a smokey or buttery flavor.

11. The substantially batter free, unbreaded food product of claim 1 wherein said alkyl cellulose ether is hydroxypropylmethylcellulose.

12. The substantially batter free, unbreaded food product of claim 1 wherein said plasma protein comprises a blood plasma hydrolyzed meat protein.

13. The substantially batter free, unbreaded food product of claim 1 wherein said blend comprises about 85% hydroxypropylmethylcellulose, about 10% of a hydrolyzed bovine blood plasma protein and about 5% guar gum.

14. The substantially batter free, unbreaded food product of claim 1 wherein said alkyl cellulose ether comprises about 85% hydroxypropylmethylcellulose, about 10% of a hydrolyzed bovine blood plasma protein and about 5% dextrose.

15. The substantially batter free, unbreaded food product of claim 1 wherein said blend is a hydrated and heat set edible skin.

16. The substantially batter free, unbreaded food product of claim 15 wherein said coated food product is capable of being cooked on a hot surface without sticking, charring or breaking apart.

17. The substantially batter free, unbreaded food product of claim 1 wherein said food portion is a fish portion.

18. The substantially batter free, unbreaded food product of claim 17 wherein said fish portion is a cod fish portion.

19. The substantially batter free, unbreaded food product of claim 17 wherein said fish portion is a pollock fish portion.

20. The substantially batter free, unbreaded food product of claim 1 wherein said food portion is an onion slice.

21. The substantially batter free, unbreaded food product of claim 1 wherein said food portion is a zucchini slice.

22. The substantially batter free, unbreaded food product of claim 1 wherein said food portion is a beef portion.

* * * * *